3,310,415
REFRACTORY MATERIAL
Robert A. Paul and Otto L. Forchheimer, York, Pa., assignors to The J. E. Baker Company, York, Pa., a corporation of Pennsylvania
No Drawing. Filed May 13, 1965, Ser. No. 455,649
9 Claims. (Cl. 106—58)

This invention relates to a novel and unexpected use of tar bonded refractories. More particularly, this invention relates to a novel form of refractory material for addition to refractory lined furnaces by accepted mechanical and manual methods of introduction, which material forms denser linings and burns-in more rapidly than previously known materials.

It has long been the practice in the steel industry to use granular basic refractory materials such as calcite, dolomite, and magnesite for the protection of hearth refractories in steelmaking furnaces. For many years, such refractories were shoveled into place requiring much labor for this arduous task. More recently, the materials have been placed by mechanical means using a sling gun, or similar device, capable of shooting dry granular materials into a hot furnace with sufficient force to permit the materials to stick to refractory surfaces on impact. Such mechanical devices are limited to the use of refractory grains of reasonably uniform size because unduly large particles are impelled with such force that they bounce off rather than stick to the refractory, etc., while unduly small particles are impelled with such little force that they do not reach a desired surface. Also the shooting of fines creates dust.

It was known to coat particles of calcined dolomite and calcite with pitch to prevent hydration. However, the particles were first screened to a substantially uniform size, and fines were removed. In the prior art the particles were coated by simply stirring or tumbling them with hot pitch in order to place a layer of protective coating on each particle to prevent hydration. Thus in the prior art, pitch-coated particles of uniform size were obtained by applying hot pitch to a uniformly sized substrate. The use of particles screened before bonding has two disadvantages. First, the resulting refractory lining is less dense than one made up of a distribution of particle sizes. Second, by using rather large particles, higher temperatures or longer times are required to burn-in than are required for a lining including finer materials.

Burning-in is the formation of a solid monolith of lining and patch material. Where a pitch is used as a temporary binder coke is formed during the early stages of burning-in, and oxidizes away later. An ideal burn-in results in sintering of the patch material to itself and the refractory lining.

Where a wide range of sizes of materials has been used, the particles have tended to segregate in handling and therefore cannot be shipped in bulk but must be packaged in bags, drums, and similar containers at additional expense. Even where materials are shipped in a bag, etc., segregation by particle size will occur. Such materials cannot be inserted into the furnace mechanically but must be shoveled or thrown in by hand or some other fashion. Where fines were used in the prior art, they were comprised of silica-stabilized dolomite. Silica stabilization prevents hydration but reduces the refractoriness of the lining, that is the lining fuses at a lower temperature when it contains silica.

It is an object of this invention to describe a new composition of matter, and a method of its preparation and use, which may be used to prepare a superior refractory and fettling material.

It is another object of this invention to provide a form of refractory material which may be mechanically or manually inserted into a furnace to form refractory linings, and which is made up of uniform particles containing a wide range of grain sizes, and which forms high density linings which burn-in rapidly.

It is another object of this invention to provide a method of manufacturing a granular refractory material of known or desired size distribution so that the size distribution is maintained and is not affected by segregation.

It is a further object of this invention to provide a granular refractory material of predetermined particle size distribution which adheres to surfaces by means of a temporary binder and permits the granular refractory time to burn-in, without the use of materials which lower the refractoriness of the refractory materials.

It is still a further object of this invention to describe a new use of a previously known bituminous binder for basic refractory granular materials as a temporary binder to permit the use of small grain sizes for more rapid burning-in, while preventing segregation of grain sizes during shipping, storing and handling.

A patch material meeting the objects of the invention may be achieved by bonding together a designed size range of refractory particles by means of a temporary bituminous binder, and then forming aggregates, comprised of a plurality of the particles.

The invention may be used with any type of refractory materials but is particularly useful for the introduction of basic materials, such as dead-burned magnesite, dead-burned dolomite and dead-burned calcite. For convenience, the invention will described with regard to dolomite. The product comprises aggregates (or granules) of approximately the same size as those described in the prior art except that the particles included in the aggregates comprise fines as well as coarser particles.

Utilization of the dolomite fines in making the product is an advantage in the process of making the material and is also an advantage in the final product itself. The fines are an advantage in the process in that they permit the use of all of the dolomite without waste where good size control is maintained. The fines in the product sinter at usual steel furnace operating temperatures to form a permanent ceramic bond with the larger particles.

The dolomite used in the present invention is desirably dead-burned at temperatures above 3100° F., preferably 3200° F. and above. Advantageously, dead-burned particles above 3100° F. shrink less in use than do those calcined or heated to lower temperatures. The composition of the present invention produces a volume-stable refractory which will not shrink substantially at high use temperatures, such as steel furnace temperatures.

The particle size range of the dolomite leads to a high density rafractory. The green density of the composition prior to crushing into the final aggregate particles is a minimum of 2.4 grams per cubic centimeter (g./cc.), and preferably is 2.5 g./cc. or higher. The high density of the present composition prior to being sized into particulate aggregates, whether obtained by a careful mixing cycle or by added compression, leads to a burned-in refractory of high density and good strength.

The particles of dolomite useful in the practice of this invention range from less than 325 mesh (U.S. Sieve Series) up to grains about ⅜″ in their largest dimension. Fines may be defined as particles less than 20 mesh in size.

The aggregates formed by binding the particles together, are sized to between about ¾ inch and 40 mesh, in the largest dimension. Where the material is to be placed by slinging the aggregate particles are made substantially uniform in size, preferably between ¼ and ⅜ inch. The dolomite particles must be smaller than the smallest size of bonded particles to be contained in the mixture. By using agglomerates of a rather uniform size made up of particles of a large variety of sizes, the advantages of a well graded, densely packed refractory material may be obtained without the disadvantages of segregation by particle sizes during handling and in application.

The binder may constitute about 6 to 10 percent by weight of the dolomite, and preferably between 7 and 8 percent. Further, the softening point of the pitch must be sufficiently high so that the aggregates of the mix remain discrete and do not become one solid mass due to the binder softening in shipment or during storage. The binder may be a bituminous substance, such as a pitch and may have a minimum softening point range of 80° C. (ring and ball; ASTM E–28, 1958) preferably a softening point of 90° C. A high softening point pitch is desirable so that a strong carbonaceous bond may be formed early during burn-in. Also a high softening point pitch will normally have a high coking value which is the accepted measure of such a bond. The coke burns-out when exposed to oxygen, as in air at high temperatures. Coal-tar-pitch has been found to be especially advantageous. Coal-tar-pitch is a residue from the distillation of coal-tar.

The aggregates may be made by extruding the mix of dolomite particles and tar, and chopping the extrusion into particles of the right size. Another method is to form the mix into a mass between rolls on a conveyor and then crush the sheet formed and screen it, undersized and oversized particles be recycled.

In a hot furnace the temporary binder decomposes forming a strong but temporary carbon bond, as the carbon bond burns-out the graded sizes of refractory material rapidly burn-in to form a dense lining. The furnace temperature at the time of introduction of the patch material may be any temperature, but preferably is between about 2600–2900° F. Field trials have shown strong corbon bonds form within ten minutes after addition to furnaces. Some compositions will set, or form carbon bonds, in as lettle as five minutes at appropriate temperatures. The use of dolomite fines in the mix ensures the rapid formation of a ceramic bond as the coke bond burns off.

The uniformly sized, bonded particles, follow a substantially similar trajectory when propelled through the air and may be introduced into steelmaking furnaces, etc., by means of a sling gun or similar device without loss by bouncing off the walls, etc., and without a failure to reach the desired surface. The bonded particles have been found to stick to the type of refractory brick normally used in steel-making furnaces.

An alternate method of carrying out the invention is to use a mixture of coarse unbonded refractory grain and tar bonded aggregates of finer refractory grains, such aggregates being of substantially the same size as the coarser grains so that they will assume a substantially similar trajectory.

The addition of a flux such as iron oxide, aluminum oxide, etc., to the dead-burned dolomite is known in the art to prevent hydration and speed the formation of a ceramic bond. Such fluxed dead-burned dolomite may be used in combination with the novel features of the invention, if desired.

The composition of the present invention does not require the use of a flux because the use of a high softening point pitch enables a strong coke bond to be formed immediately and forms a protective coating around the dead-burned dolomite to prevent hydration.

It has been found that particular particle size ranges result in optimum packing to produce a high density refractory. A workable screen fraction range using dead-burned dolomites for the preparation of a tar-bonded dolomite material may be used as a bottom patching material for open hearth, oxygen steelmaking vessels, rotary kilns, electric furnaces, as well as other uses. Any combination of the following dead-burned dolomite screen fractions, which total 100% has been found to be satisfactory for preparing a composition embodying the features of the present invention.

| Particle Size | | Concentration Range (Percent by Weight) |
| --- | --- | --- |
| Less Than— | Greater Than— | |
| ⅜ inch | ¼ inch | 2–11 |
| ¼ inch | ⅛ inch | 15–35 |
| ⅛ inch | 10 mesh | 6–10 |
| 10 mesh | 20 mesh | 5–20 |
| 20 mesh | 50 mesh | 5–20 |
| 50 mesh | 100 mesh | 5–20 |
| 100 mesh | 200 mesh | 5–15 |
| 200 mesh | 325 mesh | 2–12 |
| 325 mesh | | 2–10 |

Refractory materials making use of the screen fractions above have been found to be satisfactory when any combination of the following particle sizes of the aggregates are in the following ranges:

| Smaller Than— | Larger Than— | Percent by Weight |
| --- | --- | --- |
| ¾ inch | ½ inch | 10–40 |
| ½ inch | ⅜ inch | 5–25 |
| ⅜ inch | ¼ inch | 5–30 |
| ¼ inch | | 10–40 |

The patch material may be prepared with any piece of equipment, or combinations of equipment, that can heat dead-burned dolomite to a desired temperature, blend tar with the dolomite, and densify the tar-coated dolomites by agitation and settling, or compaction. Examples of such equipment are rotary driers in conjunction with jacketed mixing devices or extrusion machines. The pitch bonded aggregates made by the present process are useful in lining or patching the linings of steel furnaces. The composition of the present invention forms dense linings rapidly, thus giving industry a cheap substitute for the more expensive fettling materials previously used to obtain rapid burn-in and high density.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

The following dead-burned dolomite screen fractions were preheated to 149° C. in a rotating drier:

| Smaller Than— | Larger Than— | Percent by Weight |
| --- | --- | --- |
| ⅜ inch | ¼ inch | 11 |
| ¼ inch | ⅛ inch | 21 |
| ⅛ inch | 10 mesh | 7 |
| 10 mesh | 20 mesh | 11 |
| 20 mesh | 50 mesh | 18 |
| 50 mesh | 100 mesh | 13 |
| 100 mesh | 200 mesh | 11 |
| 200 mesh | 325 mesh | 4 |
| 325 mesh | | 4 |
| | | 100 |

Then, pitch with a ring and ball softening point of 101° C. was heated to 156° C. A portion of the pitch, equivalent to 7.8 percent of the dead-burned dolomite mix weight, was poured evenly over the dolomite particles agitating in a plug mill. After adding the pitch, the mix was agitated for a total of 15 minutes. Heat to the pug mill jacket was adjusted so that after a 15 minute settling period, the pitch-bonded dolomite temperature was at 157° C. Following the settling, the mix was agitated for another 15 minute period. Then, the mix was emptied into galvanized metal forms to a depth of 3 inches, width of 12 inches, and length of 36 inches. The mix had a bulk density of 2.50 g./cc. The mix in the metal forms was leveled to a depth of 3 inches. After a 10 minute cooling period, the mix in the forms was slotted with a metal cutter at 5 inch intervals. Upon cooling to room temperature, the 12" x 5" x 3" pitch-bonded dolomite sections were fed to a suitable crusher set to crush the sections into the following screen fractions.

| Smaller Than— | Larger Than— | Percent |
|---|---|---|
| 3/4 inch | 1/2 inch | 30 |
| 1/2 inch | 3/8 inch | 17 |
| 3/8 inch | 1/4 inch | 19 |
| 1/4 inch | | 34 |
| | | 100 |

The material was used to patch the lining of a steelmaking furnace.

EXAMPLE II

Material was prepared by an extrusion method. The following dead-burned dolomite screen fractions were preheated to 151° C. in a rotating drier:

| Particle Size | | Percent by Weight |
|---|---|---|
| Smaller Than— | Larger Than— | |
| 3/8 inch | 1/4 inch | 5 |
| 1/4 inch | 1/8 inch | 30 |
| 1/8 inch | 10 mesh | 6 |
| 10 mesh | 20 mesh | 16 |
| 20 mesh | 50 mesh | 6 |
| 50 mesh | 100 mesh | 8 |
| 100 mesh | 200 mesh | 11 |
| 200 mesh | 325 mesh | 11 |
| 325 mesh | | 7 |
| | | 100 |

Then, pitch with a ring and ball softening point of 95° C. was heated to 156° C. A portion of the pitch equivalent to 7.5 percent of the dead-burned dolomite mix weight was poured evenly over the rotating dolomite particles. After adding the pitch, the mix was agitated for a total of 15 minutes. Heat to the pug mill jacket was adjusted so that after a 15 minute settling period, the pitch-bonded dolomite temperature was at 159° C. Following the settling, the mix was gradually emptied into feed containers which were used to retain the hot mix while it was being fed to a jacketed extrusion machine. The jacket on the extrusion machine was kept at 138° C. The feed rate to the extrusion machine was adjusted to produce 3/4 inch diameter extrusions which had a bulk density of 2.70 g./cc. The extrusions were sliced at 1/4 inch, 3/8 inch and 1/2 inch lengths. The cool extrusion pieces were blended as follows:

Size: Percent by weight
1/2 inch _____ 10
3/8 inch _____ 30
1/4 inch _____ 60
                                         ___
                                         100

The material was used for further laboratory experimentations, including burn-in test and was found to be satisfactory.

EXAMPLE III

An open hearth trial of two tons of a composition made according to the present invention was made by patching a bottom which had been through more than 100 heats of a 140 heat campaign. The material burned-in after approximately 5 minutes of exposure to fairly low temperatures which were less than 2650° F. maximum.

During the fettling period the fuel was turned off and the bottom poorly drained by blowing with three pipes. The material was used to raise a flat and extended between two doors. In order to level the flat, the patch was only a fraction of an inch in depth at the patch edges away from the furnace bank. The delay for repairs was 20 minutes; the fuel was turned on, and scrap charged over the smoking patch. The patch was observed to be in excellent condition after tapping of the heat. After tapping the next successive heat, 14 hours-5 minute tap to tap, the furnace flat was eroded in front of the patch. The erosion seemed to be in the old bottom rather than in the patch.

The shallow patch over a poorly drained and old bottom is an excellent test. It was followed closely and sampled when the furnace shut down for repairs. The performance of the patch was satisfactory.

EXAMPLE IV

Comparative tests of installation techniques were made of materials made by the method of the present invention.

A. An experiment was carried out on a small scale by shoveling pitch-bonded dolomite aggregates against the wall of a rotary kiln while the kiln was in operation. The pitch-bonded aggregate ranged between about 1/4 inch and 3/4 inch in size and contained graded sizes of dolomite from 1/4 inch down to 100 mesh, and approximately 8 percent pitch. The results were satisfactory.

B. A larger-scale experiment was carried out by shooting about one hundred pounds of pitch-bonded sized aggregates into the same kiln by means of a sling similar to the dolomite slings used in the steel industry to introduce granular fettling materials into open hearth furnaces. The results were satisfactory.

C. A further one hundred pounds of pitch-bonded sized aggregates were hand shoveled against the side of the kiln. In both cases, it was observed that the material fettled to the refractory kiln lining and could be observed still sticking after several revolutions of the kiln in spite of abrasion by the kiln load. The results were satisfactory.

D. Further aggregates were shoveled into a four inch deep hole approximately two feet in diameter while the rotation of the kiln was stopped. The patch was permitted to burn-in for 5 minutes before the rotation of the kiln was again started. The patch was still observed in place an hour after placement in spite of the severe conditions of rotation and abrasion, and the lower temperatures prevailing than in a steel furnace. Temperature at the time of introduction of material was about 2600° F. while an open hearth furnace will have a temperature of around 2900° F. immediately after tapping. The results were satisfactory.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A granular refractory material which may be handled and stored without segregation and which forms a high density refractory after burn-in consisting essentially of aggregates each aggregate having a density of at least 2.4 grams per cubic centimeter and said aggregates further consisting essentially of from about 6 to 10 percent by weight of a bituminous temporary binder having a minimum softening point range of about 80° C. and a plurality of refractory particles selected from the class consisting of dead burned magnesite, dead burned dolomite and dead burned calcite, said particles having the following ranges:

| Smaller Than— | Larger Than— | Percent Range |
|---|---|---|
| ⅜ inch | ¼ inch | 2–11 |
| ¼ inch | ⅛ inch | 15–35 |
| ⅛ inch | 10 mesh | 6–10 |
| 10 mesh | 20 mesh | 5–20 |
| 20 mesh | 50 mesh | 5–20 |
| 50 mesh | 100 mesh | 5–20 |
| 100 mesh | 200 mesh | 5–15 |
| 200 mesh | 325 mesh | 2–12 |
| 325 mesh | | 2–10 |

2. A method of preparing a granular refractory material comprising preheating volume-stable refractory particles selected from the class consisting of dead burned magnesite, dead burned dolomite and dead burned calcite and having the following size ranges:

| Smaller Than— | Larger Than— | Percent Range |
|---|---|---|
| ⅜ inch | ¼ inch | 2–11 |
| ¼ inch | ⅛ inch | 15–35 |
| ⅛ inch | 10 mesh | 6–10 |
| 10 mesh | 20 mesh | 5–20 |
| 20 mesh | 50 mesh | 5–20 |
| 50 mesh | 100 mesh | 5–20 |
| 100 mesh | 200 mesh | 5–15 |
| 200 mesh | 325 mesh | 2–12 |
| 325 mesh | | 2–10 | agglomerating the particles with about 6 to 10 percent of a bituminous substance having a softening point of at least 80° C. and being heated to a free flowing liquid above its softening point; compacting said agglomerated partices to a density of at least 2.4 grams per cubic centimeter; cooling the compacted mass; and crushing the cooled mass to a predetermined aggregate size.

3. A refractory material according to claim 1 wherein the refractory particles are dead-burned dolomite.

4. A refractory material according to claim 1 wherein the bituminous binder has a softening point of at least 90° C.

5. A refractory material according to claim 1 wherein the sizes of the aggregates are in the following ranges:

| Smaller Than | Larger Than | Percent by Weight |
|---|---|---|
| ¾ inch | ½ inch | 10–40 |
| ½ inch | ⅜ inch | 5–25 |
| ⅜ inch | ¼ inch | 5–30 |
| ¼ inch | | 10–40 |

6. A refractory material according to claim 1 wherein the aggregate size range is:

10 percent on a ½ inch screen
30 percent on a ⅜ inch screen
60 percent on a ¼ inch screen.

7. A refractory material according to claim 1 wherein the aggregate size range is substantially uniform.

8. A refractory material according to claim 7 wherein the aggregate size range is between about ¼ and ⅜ inch.

9. A method according to claim 2 wherein the refractory particles are dead-burned dolomite.

References Cited by the Examiner

UNITED STATES PATENTS

| 2,943,240 | 6/1960 | Martinet | 106—58 |
| 3,044,889 | 7/1962 | Ekedakl et al. | 106—58 |
| 3,124,471 | 3/1964 | Spetzler et al. | 106—58 |
| 3,168,602 | 2/1965 | Davies et al. | 106—58 |

TOBIAS E. LEVOW, *Primary Examiner.*

HELEN M. McCARTHY, *Examiner.*

J. E. POER, *Assistant Examiner.*